(12) United States Patent
Fang (10) Patent No.: US 8,887,989 B2
(45) Date of Patent: Nov. 18, 2014

(54) METHOD FOR PROVIDING MULTIMEDIA SERVICE, POS MACHINE AND MOBILE TERMINAL

(75) Inventor: Wen Fang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 142 days.

(21) Appl. No.: 13/259,198

(22) PCT Filed: Aug. 16, 2010

(86) PCT No.: PCT/CN2010/076038
§ 371 (c)(1),
(2), (4) Date: May 3, 2012

(87) PCT Pub. No.: WO2011/140757
PCT Pub. Date: Nov. 17, 2011

(65) Prior Publication Data
US 2012/0205434 A1 Aug. 16, 2012

(30) Foreign Application Priority Data
May 11, 2010 (CN) .......................... 2010 1 0178240

(51) Int. Cl.
*G06Q 20/00* (2012.01)
*G06Q 20/20* (2012.01)
*G06Q 20/32* (2012.01)
*G06Q 20/12* (2012.01)

(52) U.S. Cl.
CPC ............ *G06Q 20/3278* (2013.01); *G06Q 20/20* (2013.01); *G06Q 20/123* (2013.01)
USPC ........................ 235/375; 455/414.1; 455/466

(58) Field of Classification Search
USPC .................................. 235/375; 455/414.1, 466
See application file for complete search history.

(56) References Cited

U.S. PATENT DOCUMENTS

| 2002/0161476 | A1* | 10/2002 | Panofsky et al. ............. 700/231 |
| 2005/0021634 | A1 | 1/2005 | Naim et al. |
| 2005/0096088 | A1 | 5/2005 | Bae |
| 2006/0231611 | A1* | 10/2006 | Chakiris et al. ............... 235/380 |

(Continued)

FOREIGN PATENT DOCUMENTS

| CN | 1612632 A | 5/2005 |
| CN | 1674686 A | 9/2005 |

(Continued)

OTHER PUBLICATIONS

English Translation of PCT International Search Report for PCT/CN2010/076038, mailed Feb. 24, 2011 (3 pages).

(Continued)

*Primary Examiner* — Thien M Le
*Assistant Examiner* — Toan Ly
(74) *Attorney, Agent, or Firm* — Clark & Elbing LLP (57) ABSTRACT

The present invention discloses a method for providing a multimedia service, a POS and a mobile terminal, which method comprises the following steps: receiving by a POS the information about a multimedia service from an operator server; displaying the information about the multimedia service; receiving an operation from a RFID-SIM card; and generating an instruction according to the operation and sending a response about the instruction to the RFID-SIM card. The present invention extends the application range of the RFID-SIM card and improves user experience.

20 Claims, 4 Drawing Sheets

(56) References Cited

U.S. PATENT DOCUMENTS

| | | | |
|---|---|---|---|
| 2007/0213096 A1* | 9/2007 | Bella et al. ................... | 455/558 |
| 2008/0175390 A1 | 7/2008 | Alessio et al. | |
| 2008/0242280 A1* | 10/2008 | Shapiro et al. ............ | 455/414.3 |
| 2009/0036165 A1 | 2/2009 | Brede | |

FOREIGN PATENT DOCUMENTS

| | | | |
|---|---|---|---|
| CN | 1761342 A | | 4/2006 |
| CN | 101027699 A | | 8/2007 |
| CN | 101110105 A | | 1/2008 |
| CN | 101833832 A | | 9/2010 |
| DE | 102005003435 A1 | | 7/2006 |
| KR | 2007042029 A | * | 4/2007 |
| WO | WO-03/044710 A1 | | 5/2003 |
| WO | WO 2006137740 A1 | | 12/2006 |

OTHER PUBLICATIONS

International Search Report for International Application No. PCT/CN2010/076038, mailed Feb. 24, 2011 (3 pages).

Written Opinion of the International Searching Authority for International Application No. PCT/CN2010/076038, dated Feb. 24, 2011 (4 pages).

International Preliminary Report on Patentability for International Application No. PCT/CN2010/076038, issued Nov. 13, 2012 (5 pages).

Extended European Search Report for European Application No. 10851262, mailed Mar. 20, 2014 (7 pages).

* cited by examiner

METHOD FOR PROVIDING MULTIMEDIA SERVICE, POS MACHINE AND MOBILE TERMINAL

CROSS-REFERENCE TO RELATED APPLICATIONS

This application is the U.S. National Stage filing under 35 U.S.C. §371 of International Application No. PCT/CN2010/076038, filed Aug. 16, 2010, which claims benefit of Chinese Patent Application No. 201010178240.2, filed May 11, 2010.

FIELD OF THE INVENTION

The present invention relates to the communication field, and in particular relates to a method for providing a multimedia service, a POS and a mobile terminal.

BACKGROUND OF THE INVENTION

The radio frequency identification (abbreviated as RFID) technology is a technology of performing short range information transmission by manner of electromagnetic induction coupling. Its corresponding device is divided into two parts regarding structure, that is, a reader and an electronic tag. The reader continuously sends radio frequency signals of specific frequencies via antennae and forms a driving electromagnetic field in a certain range. When an electronic tag enters the electromagnetic field, it is stimulated to generate the induction current, acquires energy from the induction current, and sends the information stored in the chip to the reader. After the reader acquires the information via antennae(s), the reader performs decoding and corresponding communication process. The application frequency of the RFID technology is very wide, this technology can be used at all the frequencies from low frequency of 125 KHz to high frequency of 5.8 GHz, for example, the function of swiping card on the bus is an application example of this technology.

It can be known from the above contents that RFID is a kind of unidirectional data transmission. while near field communication (abbreviated as NFC) is bidirectional data transmission, that is, both parties receiving and sending messages have a reader and an electronic tag. In relevant art, the application of NFC on mobile phones has the following forms: a paste card, a smart mobile application platform (abbreviated as SMAP) and a radio frequency identification subscriber identity module (abbreviated as RFID-SIM, also referred to as RF-SIM) card.

Currently, the China Mobile begins to promote the RFID-SIM card solution, wherein the operating frequency of which is 2.4 GHz and it does not need an external antenna, and in the situation that the power supply of the mobile phone to the SIM card is sufficient, it only needs to replace a corresponding SIM card to work. The communication rate of this solution can be up to 1 MHz and the communication range is 5-10 M. The interaction can be performed on a software of the mobile phone by the manner of SIM Tool Kit (abbreviated as STK), that is, the menu application is expanded as required by the method of over the air (abbreviated as OTA), which is more flexible and convenient than writing fixed programs in the mobile phone.

Moreover, in the IOS7816 SIM card specification, it also definitely gives out such contents as the physical layer rate, command, data format, etc. of the data exchange between the SIM card and the mobile phone. For example, it supports an ordinary SIM card to send data to the mobile phone in the situation that the voltage is 5 V and it is default that $F=372$ and $D=1$, the rate of transmitting by the physical layer thereof the data from the SIM card to the mobile phone can be up to more than 10 Kb/s.

Additionally, the capacity of random access memory (abbreviated as RAM) is also gradually increased. The RAM capacity of the SC28 type SIM card of Motorola can be up to 30 KB. The following table is the information of this type SIM card:

| type | processor | ROM | RAM | EPROM |
|---|---|---|---|---|
| Motorola SC28 | 8 bits | 6 Kb | 240 Kb | 8 Kb |

It can be seen from this table that although the SIM card still has difficulty in storing a whole picture or a song, it already can accommodate a certain amount of data. Consequently, with the development of technologies, the data capacity of SIM card will become bigger and bigger.

However, the inventors discover in relevant art that although the extended application of RFID-SIM card includes electronic payment, personal information identification, business card exchange, etc., still no method for performing personalized setting for the mobile phone using the RFID-SIM card is proposed in either the current market products or the existing patent documents.

SUMMARY OF THE INVENTION

One object of the present invention is to provide a solution for providing a multimedia service so as to solve the above problems.

In order to achieve the above object, a method for providing a multimedia service is provided according to one aspect of the present invention.

The method for providing a multimedia service according to the present invention comprises the steps of: receiving, by a POS, information about a multimedia service from an operator server; displaying the information about the multimedia service; receiving an operation from a RFID-SIM card; and generating an instruction according to the operation and sending a response about the instruction to the RFID-SIM card.

Furthermore, after receiving the operation from the RFID-SIM card, further comprising: sending the information about the multimedia service to the RFID-SIM card.

Furthermore, after sending a response about the instruction to the RFID-SIM card, further comprising: storing, by the RFID-SIM card, the information about the multimedia service received into a random access memory (RAM) of the RFID-SIM card, and reading, by a mobile terminal installed with the RFID-SIM card, the information about the multimedia service from the RAM to generate a serving menu for user selection.

Furthermore, the step of receiving an operation from a RFID-SIM card comprises: acquiring by the RFID-SIM card a selection of a user made for the multimedia service according to the information about the multimedia service, and sending by the RFID-SIM card the multimedia service selected by the user to the POS.

Furthermore, the step of sending a response about the instruction to the RFID-SIM card comprises: sending by the POS a data file corresponding to the multimedia service selected by the user to the RFID-SIM card, wherein the data file includes an image or music received from the operator server by manner of wireless internet.

Furthermore, after sending a response about the instruction to the RFID-SIM card, further comprising: informing, by the POS, an operator to update the multimedia service of the user.

Furthermore, the operation comprises establishing a connection between the RFID-SIM card and the POS, and the method further comprises: providing by the POS an interface to acquire a selection of a user made for the multimedia service.

Furthermore, after sending a response about the instruction to the RFID-SIM card, further comprising: sending, by the POS, a charge changing message to a charging server so as to inform the charging server to perform corresponding charge for the multimedia service selected.

Furthermore, the information about the multimedia service comprises: serving name of the multimedia service, and charge information of the multimedia service.

Furthermore, the serving name of the multimedia service comprises at least one of the followings: a wallpaper service, a color ring service, a service about startup greeting message, a voice call ringtone service, a short message ringtone service, and a theme service.

In order to achieve the above objects, a POS is provided according to another aspect of the present invention.

The POS according to the present invention comprises: a receiving module, configured to receive information about a multimedia service from an operator server and receive an operation from a RFID-SIM card; a displaying module, configured to display the information about the multimedia service; a generating module, configured to generate an instruction according to the operation, wherein the instruction is to send the information about the multimedia service to the RFID-SIM card; and a sending module, configured to send a response about the instruction to the RFID-SIM card.

Furthermore, the sending module is further configured to send a data file corresponding to a multimedia service selected by the user to the RFID-SIM card and to send a charge changing message to a charging server so as to inform the charging server to perform corresponding charge for the multimedia service, wherein the data file includes an image or ringtone received from the operator server by manner of wireless internet.

In order to achieve the above objects, a mobile terminal is provided according to still another aspect of the present invention.

The mobile terminal according to the present invention comprises a RFID-SIM card, wherein the RFID-SIM card comprises: a receiving unit configured to receive information about a multimedia service from a POS and a data file corresponding to a multimedia service selected by a user, wherein the information about the multimedia service is provided by an operator server, and the data file includes an image or ringtone received from the operator server by manner of wireless internet; a storing unit, configured to store the information about the multimedia service received from the receiving unit into a random access memory (RAM) of the RFID-SIM card; and a sending module, configured to send the multimedia service selected by the user to the POS; and the mobile terminal further comprises: an acquiring module, configured to acquire the multimedia service selected by the user; and a setting module, configured to read the information about the multimedia service from the RAM of the RFID-SIM card so as to make the information be selected by a user.

By virtue of the present invention, a POS is used to receive the information about a multimedia service from an operator server. By the manner that the RFID-SIM card is in connection with the POS to download a multimedia service required by a user, the problem is solved that the RFID-SIM card can not perform personalized setting for the mobile phone, the application range of the RFID-SIM card is extended and the user experience is improved.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention. In the drawings.

DETAILED DESCRIPTION OF EMBODIMENTS

The present invention will now be described in detail with reference to the drawings and in conjunction with embodiments in the following. It needs to note that the embodiments of the present application and the features of the embodiments can be combined with each other in the situation of no conflict.

A method for providing a multimedia service is provided according to the embodiments of the present invention.

Figure 1:
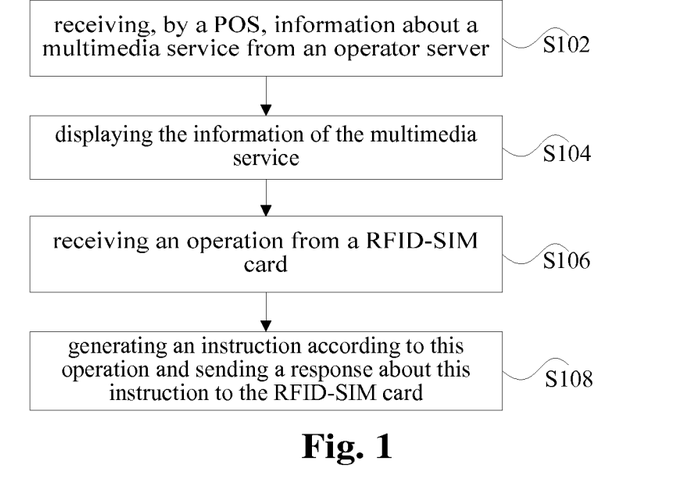
FIG. 1 is a flow chart of a method for providing a multimedia service according to the embodiments of the present invention.

FIG. 1 is a flow chart of a method for providing a multimedia service according to the embodiments of the present invention, and as shown in FIG. 1, this method comprises the following steps:

Step S102: a POS receives information about a multimedia service from an operator server;

Step S104: displaying the information about the multimedia service;

Step S106: receiving an operation from a RFID-SIM card; and

Step S108: generating an instruction according to this operation and sending a response about this instruction to the RFID-SIM card.

By virtue of the above embodiments of the present invention, a POS is used to receive the information about a multimedia service from an operator server, and displays the information on a corresponding display device of the POS. By establishing a connection between a RFID-SIM card and the POS, the POS receives a serving request operation about multimedia service from a RFID-SIM card and sends the relevant information of the multimedia service required by a user to the RFID-SIM card in response to this request operation, which solves the problem that the RFID-SIM card can not perform personalized setting for the mobile phone, extends the application range of the RFID-SIM card and improves user experience.

During the particular implementation process, the operation from the RFID-SIM card can be a wireless connection request and can be a user's customized selection of a multimedia service (for example, setting one certain ringtone as the alarm or downloading a color ring or image information) and the like. The POS can generate a corresponding instruction according to the different operations from the RFID-SIM card, for example, if what received is a service of downloading a color ring by a user (i.e. an operation of a user), it first searches whether there is the color ring at local, if not, then it needs to request the color ring from an operator server, otherwise it directly sends the color ring to a terminal installed with a RFID-SIM card by manner of RFID.

Preferably, the information about a multimedia service in step S102 can be pushed actively by an operator server and can also be multimedia service's information (information of the multimedia service) which the POS applies to the operator server for downloading after having received a user's request about multimedia service serving.

Preferably, after step S106, this method can further comprise: sending the information about the multimedia service to the RFID-SIM card. This method is advantageous for a user to perform selection operation for a multimedia service on a mobile terminal installed with a RFID-SIM card, which improves the flexibility of the system.

Preferably, the information of the multimedia service can include: serving name of the multimedia service and charge information of the multimedia service. In this case, the serving name of the multimedia service can include at least one of the followings: a wallpaper service, a color ring service, a service about startup greeting message, a voice call ringtone service, a short message ringtone service, and a theme service. The implementation of this method is simple and the operability of the method is good.

Preferably, in step S106, the RFID-SIM card acquires the selection which the user makes for the multimedia service according to the information about the multimedia service and sends the multimedia service selected by the user to the POS. This method can acquire user's selection of a multimedia service on a peripheral interface provided by a terminal installed with a RFID-SIM card and then transmits the result of the selection to the POS via RFID technology, which achieves the function that a user can view and select multimedia service on the interface of the mobile terminal and improves the easily used performance of the system.

Preferably, in step S108, the POS sends a data file (i.e. sending a response about the instruction) corresponding to the multimedia service selected by the user to the RFID-SIM card, wherein the data file includes an image or music received from an operator server by manner of wireless internet (for example, the data file corresponding to the multimedia service received from the operator server can be first stored in the POS and then the data file corresponding to the multimedia service is sent to the RFID-SIM card after the user has selected the interested multimedia service). Additionally, the POS can inform an operator to update the multimedia service of the user. That is, when the selected multimedia service needs the operator server to update user information, the POS further needs to send the multimedia service selected by the user to the operator server so as to inform it to update the service information of this user. This can maintain the synchronization between the service information of the user in the operator server and the real information of the mobile terminal, thus improving system accuracy.

The method of this preferred embodiment can make a mobile terminal which is installed with a RFID-SIM card obtain the corresponding resources (file data provided by the operator server) used by the multimedia service selected by a user, thus performing personalized setting for the mobile terminal, extending the function of the FRID-SIM card and improving system performance.

During the particular implementation process, the above operation can also be the change (for example, updating color ring) made for one certain service by the user. A service updating request is generated and sent to the operator server after having received this operation and the user (i.e. a mobile terminal installed with a RFID-SIM card) is informed of the updating result.

Preferably, after step S108, this method can further comprise: performing corresponding setting for the mobile terminal, which the mobile terminal is installed with a RFID-SIM card, according to the response about the instruction in step S108. For example, the RFID-SIM card can store the received information about the multimedia service into a RAM of the RFID-SIM card, and the mobile terminal installed with a RFID-SIM card reads the information about the multimedia service from the RAM so as to generating a serving menu for being selected by the user.

The difference between present preferred embodiment and the manner of reading from the read only memory (abbreviated as ROM) in relevant art lies in: in present preferred embodiment, the information about the multimedia service provided by an operator server and received by RFID technology is stored into the RAM and then the stored information is read immediately from the RAM, which saves system resources and the process time of the system.

Preferably, the operation in step S106 includes establishing a connection between the RFID-SIM card and the POS, and the above method further comprises: the POS provides an interface to acquire the user's selection of a multimedia service.

In this preferred embodiment, the user can directly select a multimedia service on the POS, thus it only needs to transmit the file data corresponding to the multimedia service selected by the user via the above connection established between the RFID-SIM card and the POS without sending all the information about the multimedia service provided by the operator server on the POS to the RFID-SIM card, therefore the interaction between data is reduced and the system effectiveness is improved.

Preferably, after step S108, the POS sends a charge changing message to a charging server so as to inform the charging server to perform corresponding charge to the selected multimedia service. Additionally, when the selected multimedia service needs the operator server to update user information, the POS first sends the multimedia service selected by the user to the operator server, informs it to update the service information of this user, and then charges for the updated service information of this user. This method is advantageous for an operator to charge for the multimedia service selected by a user, increases the profit-making mode of the operator and improves the accuracy and effectiveness of system counting.

Figure 2:
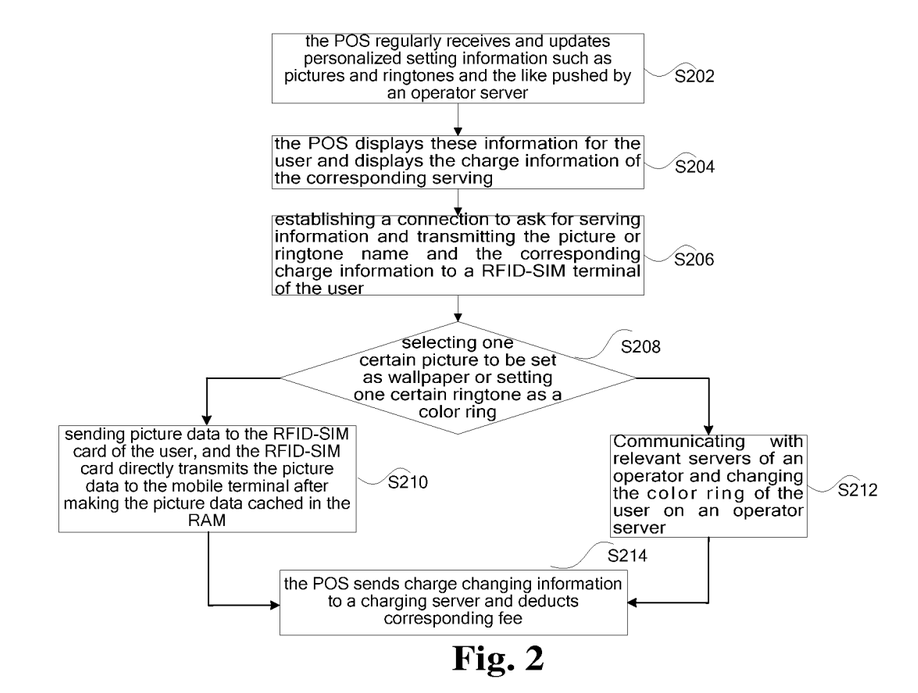
FIG. 2 is a flow chart of a method for providing a multimedia service according to the preferred embodiments of the present invention.

FIG. 2 is a flow chart of a method for providing a multimedia service according to the preferred embodiments of the present invention, and as shown in FIG. 2, this method comprises the following steps:

Step S202: A POS (i.e. point of sales, abbreviated as POS), which provides serving, regularly receives and updates such personalized setting information as image and ringtone, etc., pushed by the operator server by manner of wireless communication.

During the particular implementation process, the operator server can push data information (i.e. the information about the multimedia service) to a terminal, which is similar to the dynamic content delivery (abbreviated as DCD) service of China Mobile. To implement this portion, an apparatus, which supports wireless internet and is responsible for receiving the image and ringtone data pushed by an operator server, is required to be disposed inside the POS. In this case, the typical structure of this apparatus is wireless network card+ SIM card, but present application is not limited to this structure.

Step S204: The POS displays this information (i.e. the information about the multimedia service) on its corresponding display and voice devices (such as screen and earphone apparatus) for the user and displays the charge information of the corresponding serving.

Step S206: The user is satisfied with one certain image or ringtone and uses a RFID-SIM terminal to establish a connection with the POS to ask for serving information. The POS transmits the name of ringtone or image and the corresponding charge information to the RFID-SIM terminal of the user by manner of RFID communication.

During the particular implementation process, since the menu of an ordinary SIM card needs to be updated by manner of OTA and the starting up and shutdown operations after updating have no influence to this menu, a temporary menu is provided here. That is, after receiving the charge information and the name of the serving from the POS, the RFID-SIM card stores them in the RAM, and a serving control module calls them from the RAM and displays them as a menu to facilitate the user selection operation. Compared with the operation of updating the menu by manner of OTA, above practice of present preferred embodiment is more time-saving and convenient and saves resources, and can immediately delete the menu after the serving is finished, and thus does not affect the next serving.

Step S208: The user can select to directly set one certain picture provided by the POS to be wallpaper or set one certain ringtone as a color ring on the mobile terminal (i.e. transmitting the information about the multimedia service to the mobile terminal via the connection between the RFID-SIM card and the POS) or on the POS. If the user performs an operation on the mobile terminal (such as the mobile phone), the corresponding information of the operation is still transmitted to the POS by manner of RFID.

Step S210: If the user selects to set a picture as wallpaper, then the POS sends picture data to the RFID-SIM card of the user by manner of RFID, and the RFID-SIM card directly transmits the picture data to the mobile terminal after making the picture data cached in the RAM. The picture data is set as the desktop (picture of the desktop) by the mobile terminal automatically.

Since the communication rate between the POS and the RFID-SIM card is 1 MHz which is far higher than the rate (ten-odd Kb/s) of transmitting data to the mobile terminal by the SIM card, there is definitely a rate bottleneck problem. Consequently, a method for combining caching and waiting to retransmit is introduced here: after having received data, the RFID-SIM card first caches them in the RAM by manner of cache queue and at the same time starts the process of transmitting data from the RAM to the mobile terminal. The data received by the RFID-SIM card is added into the queue from the tail of the queue, and the data transmitted successfully is deleted from the head of the queue. When the queue is full, it requires the POS to continuously retransmit this data till there is space to receive it.

Additionally, due to the difference in data transmission speed, it may cause the user to wait a certain time period, and three methods will be provided in the following to avoid this problem. The first method: the RAM capacity in the SIM card is improved so as to make the RAM be able to store one whole image file, and when the receiving of the RAM cache in the SIM card is finished, the user can leave the POS apparatus; the second method: a relevant communication apparatus is installed at the mobile terminal side, the RFID-SIM card and the POS are only responsible for handshaking and the real transmission of picture data can be performed between the mobile terminal and the POS; and the third method: after the handshake between the RFID-SIM card and the POS is successful, the POS informs an operator server to push relevant data to a mobile terminal user. The above three methods are all the extension and development of the concept of the embodiments of the present invention and shall all belong to the protective scope of the present invention, which will not be described in the following redundantly.

In step S210, if the user selects to set one certain music to be a color ring, then the POS directly communicates with relevant servers of the operator, changes the color ring of the user on the operator server, and returns success or failure information to the user by manner of RFID. Since the color ring is set in the operator server and does not need a user mobile terminal to store it at local, after a user has selected one certain color ring, the POS does not need to transmit color ring data to the RFID-SIM but directly informs the operator to modify the setting and deduct corresponding fee.

Step S212: After the serving selected by the user is successful, the POS sends charge changing information to an operator charging server and deducts corresponding fee.

It needs to note that, although the embodiments of the present invention only provides two servings of setting wallpaper and color ring, and uses two different manners of transmitting data to the RFID-SIM and directly informing an operator to change settings. However, any applications which set other user personalized settings (such as startup greeting message, voice call ringtone, short message ringtone, etc.) by this manner which is complied with the concept of the present invention shall also belong to the scope of the embodiments of the present invention.

Figure 3:
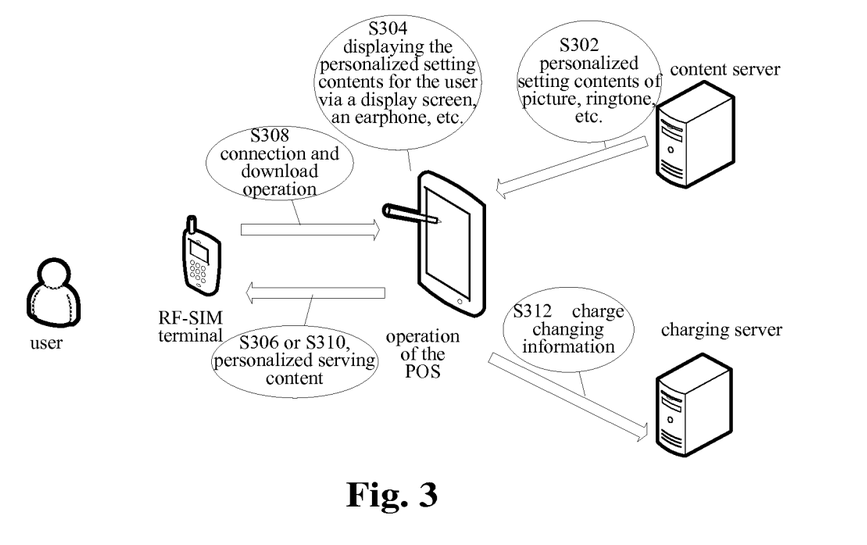
FIG. 3 is a schematic diagram of the work between a RFID-SIM mobile phone and a POS according to the preferred embodiments of the present invention.

FIG. 3 is a schematic diagram of the work between a RFID-SIM mobile phone and a POS according to the preferred embodiments of the present invention, and as shown in FIG. 3, the preferred embodiments of the present invention are described by taking changing wallpaper as an example. This procedure includes the following steps:

Step S302: A content server (i.e. operator server) pushes the file contents of the personalized setting of pictures or ringtones and the like, the corresponding serving manner of each content, and the charge information and the like (i.e. the information of multimedia service) to a card-swiping operating machine (i.e. point of sales, also referred to as POS machine).

Step S304: After having received the information, the card-swiping operating machine displays this information to an external user by manner of display screen and earphone and the like. For example, the user is interested in displayed personalized contents such as wallpaper, ringtone, etc., and uses the RFID-SIM terminal to establish a connection with the card-swiping operating machine and requests to download the menu of the current serving.

Step S306: The card-swiping operating machine sends a serving menu to the RFID-SIM terminal by manner of RFID in response to the request of the RFID-SIM terminal.

Step S308: After having received the menu, the RFID-SIM terminal displays it on a user interface, and the user selects one certain wallpaper through the menu and operates the RFID-SIM terminal to send a serving request by manner of RFID.

Step S310: After having received the request, the card-swiping operating machine sends the corresponding wallpaper picture data to the RFID-SIM terminal by manner of RFID.

Step S312: After the receiving is finished, the RFID-SIM terminal automatically sets it as wallpaper. At the same time, the card-swiping operating machine informs the charging server to update charge information.

Figure 4:
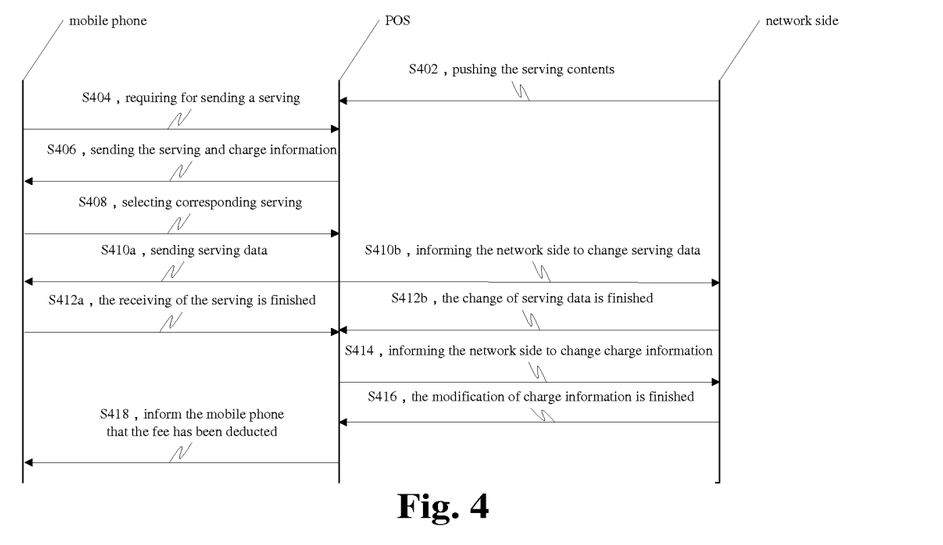
FIG. 4 is a flow chart of the work between a RFID-SIM mobile phone and a POS according to another preferred embodiment of the present invention.

FIG. 4 is a flow chart of the work between a RFID-SIM mobile phone and a POS according to another preferred embodiment of the present invention, and as shown in FIG. 4, it describes the signaling and data transmission procedure of a mobile phone, a POS and the network side, and it will be described by taking the operation of changing the settings of color ring as an example in the following. This procedure includes the following steps:

Step S402: The network side sends the ringtone content, relevant serving manner and charge information to the POS.

Step S404: A users proposes a request to the POS and asks for the POS to transmit a serving menu.

Step S406: The POS sends the serving name (i.e. setting the color ring) and the charge information to the RFID-SIM card of the user by manner of RFID.

Step S408: The user selects his favorite ringtone on the mobile phone and sends it to the POS.

Step S410: The POS informs a color ring server at the network side to update the ringtone selected by the user to be a color ring of the user according to the selection of the user.

Step S412: After the color ring server finishes the change (the update), the color ring server sends a notification to the POS.

Step S414: The POS informs the charging server to refresh the charge information and deduct fee.

Step S416: After the fee is deducted, the charging server sends a notification to the POS.

Step S418: The POS sends a notification that the fee is deducted to the mobile phone of the user by manner of RFID.

By the above embodiments of the present invention, a user can conveniently acquires wallpaper, color ring and the like of the mobile phone (i.e. performing personalized setting for the mobile phone), and it makes the user be able to replace the personalized setting of his own mobile phone by way of swiping the mobile phone on a POS, which meets the user's requirements of fashion and entertainment, and at the same time, a method for extending service and charging corresponding serving fee is provide for the operators.

Figure 5:
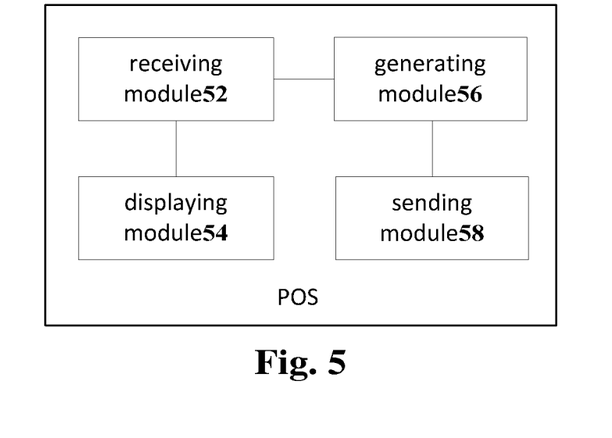
FIG. 5 is a block diagram of the structure of a POS according to the embodiments of the present invention.

FIG. 5 is a block diagram of the structure of a POS according to the embodiments of the present invention, and as shown in FIG. 5, this POS comprises: a receiving module 52, a displaying module 54, a generating module 56, and a sending module 58.

The receiving module 52 is used for receiving the information about a multimedia service from an operator server and receiving an operation from a RFID-SIM card; the displaying module 54, which is coupled to the receiving module 52, is used for displaying the information about the multimedia service; the generating module 56, which is coupled to the receiving module 52, is used for generating an instruction according to this operation, wherein the instruction is to send the information about the multimedia service to the RFID-SIM card; and the sending module 58, which is coupled to the generating module 56, is used for sending a response about the instruction to the RFID-SIM card.

Preferably, the sending module 58 is further used for sending a data file corresponding to a multimedia service selected by the user to the RFID-SIM card and sending a charge changing message to a charging server so as to inform the charging server to perform corresponding charge for the selected multimedia service, wherein the data file includes an image or ringtone received from the operator server by manner of wireless internet. For example, the POS can also store a data file corresponding to the multimedia service received by the receiving module 52 from an operator server in the POS, and the sending module 58 then sends the data file corresponding to the multimedia service to the RFID-SIM card after the user has selected an interested multimedia service.

In this embodiment, the POS receives the information about the multimedia service from the operator server. By establishing a connection between the RFID-SIM card and the POS, the multimedia service required by the user is sent to the RFID-SIM card, which improves user experience and extends the marketing approaches of the operators.

It can be seen that the POS according to the embodiments of the present invention can comprises the following functions: communicating with an operator server and receiving the mobile phone personalized setting information such as wallpaper and ringtone and the like pushed by the operator server; providing display and voice playing functions, which makes the user be able to explicitly see the wallpaper which can be changed and hear the color ring which can be changed on this POS; performing the data transmission function between itself and the RFID-SIM card, which is capable of transmitting the corresponding data to a RFID-SIM terminal; and performing the charge information transmission function between itself and the operator server, which is capable of informing the operator server to charge corresponding fee after the user has used the serving.

Figure 6:
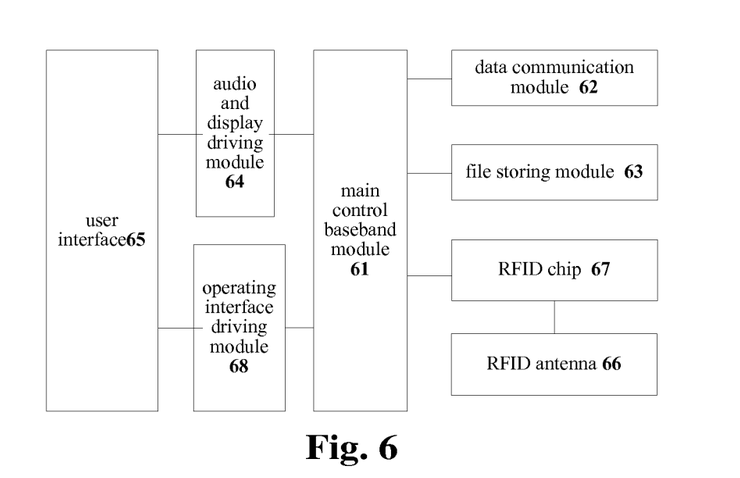
FIG. 6 is a block diagram of the structure of a RFIS POS according to the preferred embodiments of the present invention.

FIG. 6 is a block diagram of the structure of a RFIS POS according to the preferred embodiments of the present invention, and as shown in FIG. 6, the RFID POS comprises a main control baseband module 61, a data communication module 62, a file storing module 63, an audio and display driving module 64, a user interface 65, a RFID antenna 66, a RFID chip 67 and an operating interface driving module 68. This structure will now be described in detail in the following.

The main control baseband module 61 is used for the process control and data transmission of each module and is the main control device in this RFID POS.

The data communication module 62 is used for interacting with an operator server at the network side, acquiring such information as pictures, ringtones, etc. from a content server, and sending charge information to a charging server.

The file storing module 63 is used for storing the pictures, ringtones, serving type and charge information acquired by the data communication module 62 according to one certain data format.

The audio and display driving module 64 is used for driving the user interface 65.

The user interface 65 is used for displaying the music and pictures in the file storing module 63 for the user. In particular, it can include such devices as a screen, an earphone, etc. In this case, the screen is used for displaying the picture file provided by the operator and the earphone is used for playing the music file provided by the operator so as to facilitate the user selection.

The RFID antenna 66 is used for performing the transmission and receiving work of the data with the mobile phone of the user.

The RFID chip 67 is used for sorting the transmission data and transferring it to the main control baseband module 61.

The operating interface driving module 68 is used for driving some keystroke or touch operations provided for the user so as to acquire the multimedia service selected by the user.

In the embodiments of the present invention, the user can change the personalized setting of his own mobile phone by way of swiping the mobile phone (installed with a RFID-SIM card) on the POS, which meets the user's requirements of fashion and entertainment, facilitates the operators to extend serving field, and increases the corresponding turnover income.

It can be obtained from the above embodiments of the present invention that a RFID-SIM terminal (i.e. a mobile terminal installed with a RFID-SIM card) acquiring serving can include the following functions: the function of performing RFID data transmission with a corresponding POS providing service; the function of displaying such charge information as wallpaper, ringtone, etc. provided by the POS in real time; the function of transmitting the picture data acquired from the SIM card to the baseband of the mobile phone; and the function of setting a picture as the wallpaper of the mobile phone.

Figure 7:
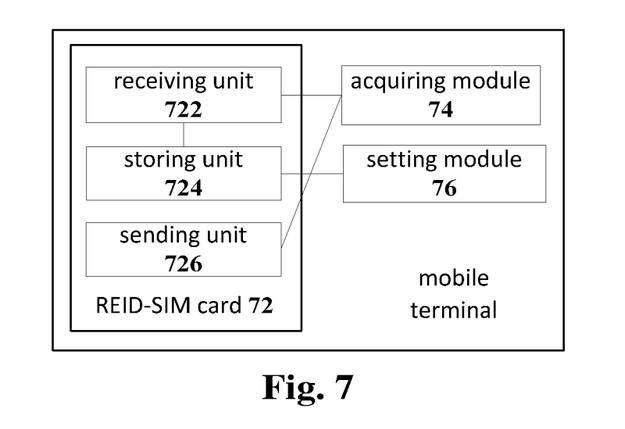
FIG. 7 is a block diagram of the structure of a mobile terminal according to the embodiments of the present invention.

FIG. 7 is a block diagram of the structure of a mobile terminal according to the embodiments of the present invention, and as shown in FIG. 7, this mobile terminal comprises a RFID-SIM card 72, an acquiring module 74, and a setting module 76. This structure will now be described in detail in the following.

The RFID-SIM card 72 comprises: a receiving unit 722, which is used for receiving the information of a multimedia service from a POS and a data file corresponding to a multimedia service selected by a user, wherein the information about the multimedia service is provided by an operator server and the data file includes an image or a ringtone received from the operator server by manner of wireless internet; a storing unit 724, which is used for storing the information about the multimedia service received from the receiving unit 722 into the RAM of the RFID-SIM card; and a sending module 726, which is used for sending the multimedia service selected by the user to the POS.

The mobile terminal further comprises: an acquiring module 74, which is coupled with the receiving unit 722 and the sending unit 726 and is used for acquiring the multimedia service selected by the user; and a setting module 76, which is coupled with the storing unit 724 and is used for reading the information about the multimedia service from the RAM of the RFID-SIM card so as to facilitate the user to make selection.

Figure 8:
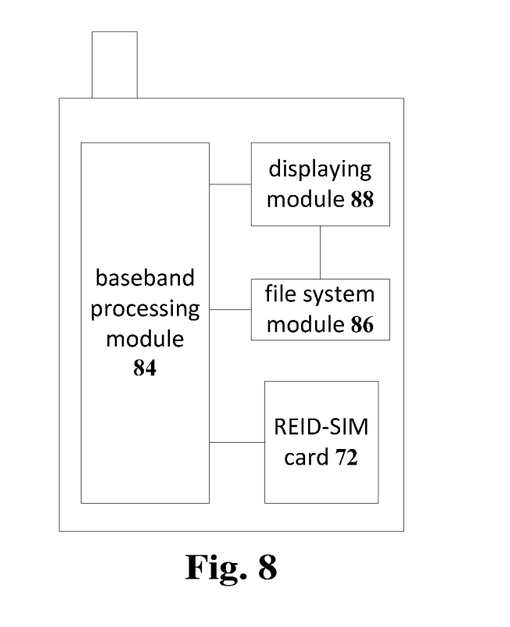
FIG. 8 is a block diagram of the structure of a mobile terminal according to the preferred embodiments of the present invention.

FIG. 8 is a block diagram of the structure of a mobile terminal according to the preferred embodiments of the present invention, which mobile terminal comprises: a RFID-SIM card 72, a baseband processing module 84, a file system module 86, and a displaying module 88.

As shown in FIG. 8, after having received the picture data, the RFID-SIM card 72 immediately transmits the picture data to the baseband processing module 84 via a SIM card-terminal interface (see ISO7816) and receives data while transmitting data. Due to the rate difference between receiving and transmission, when the cache of the RAM of SIM card is full, the RFID-SIM card 72 informs the POS to continuously retransmit till there is space for receiving new data.

After having received the picture data, the baseband processing module 84 stores it in the file system module 86, calls a relevant function section which is used for setting wallpaper, and automatically sets this picture file as wallpaper, and the displaying module 88 displays this wallpaper on the user interface of the mobile terminal.

In summary, in the embodiments of the present invention, the user can perform personalized setting for the mobile phone through a POS by manner of RFID at any time, which solves the problem that the RFID-SIM card is unable to perform personalized setting for the mobile phone, extends the application range of the RFID-SIM card, and improves user experience. At the same time, it makes the operators also be able to provide corresponding serving for the mobile phone user and charge for certain fee by sending new ringtones and wallpaper data to the POS, which has good economic value.

Apparently, those skilled in the art should understand that each module or step in the above present invention can be implemented through general-purpose computing devices and they can be put together on single computing devices or distributed on a network consisted of a plurality of computing devices, optionally, they can be implemented using computing device executable program code, therefore, they can be executed by computing devices by storing them in a storage device, and the shown or described steps can be executed in an order different from this, or they can be made into each integrated circuit module respectively or they can be implemented by making a plurality of modules or steps in them into single integrated modules respectively. Thus, the present invention is not limited to the combination of any specific hardware and software.

Above description is only to illustrate the preferred embodiments but not to limit the present invention. Various alterations and changes to the present invention are apparent to those skilled in the art. The scope defined in the present invention shall comprise any modification, equivalent substitution and improvement within the spirit and principle of the present invention.

What is claimed is:

1. A method for providing a multimedia service, comprising the steps of:
    receiving, by a POS, information about a multimedia service from an operator server;
    displaying the information about the multimedia service;
    receiving an operation from a RFID-SIM card; and
    generating an instruction according to the operation and sending a response about the instruction to the RFID-SIM card;
    wherein after having received data, the RFID-SIM card first caches the data in the RAM by manner of cache queue and at the same time starts the process of transmitting the data from the RAM to the mobile terminal, the data received by the RFID-SIM card is added into the queue from the tail of the queue, and the data transmitted successfully is deleted from the head of the queue; when the queue is full, the POS is required to continuously retransmit the data until there is space to receive the data.

2. The method according to claim 1, after receiving the operation from the RFID-SIM card, further comprising: sending the information about the multimedia service to the RFID-SIM card.

3. The method according to claim 2, after sending a response about the instruction to the RFID-SIM card, further comprising: storing, by the RFID-SIM card, the information about the multimedia service received into a random access memory (RAM) of the RFID-SIM card, and reading, by a mobile terminal installed with the RFID-SIM card, the information about the multimedia service from the RAM to generate a serving menu for user selection.

4. The method according to claim 3, wherein the step of receiving an operation from a RFID-SIM card comprises: acquiring by the RFID-SIM card a selection of a user made for the multimedia service according to the information about the multimedia service, and sending by the RFID-SIM card the multimedia service selected by the user to the POS.

5. The method according to claim 4, wherein the step of sending a response about the instruction to the RFID-SIM card comprises: sending by the POS a data file corresponding to the multimedia service selected by the user to the RFID-SIM card, wherein the data file includes an image or music received from the operator server by manner of wireless internet.

6. The method according to claim 5, after sending a response about the instruction to the RFID-SIM card, further comprising: informing, by the POS, an operator to update the multimedia service of the user.

7. The method according to claim 4, wherein the multimedia service comprises at least one of the following: a wallpaper service, a color ring service, a service about startup greeting message, a voice call ringtone service, a short message ringtone service, and a theme service.

8. The method according to claim 3, after sending a response about the instruction to the RFID-SIM card, further comprising:
  sending, by the POS, a charge changing message to a charging server so as to inform the charging server to perform corresponding charge for the multimedia service selected.

9. The method according to claim 3, wherein the information about the multimedia service comprises: serving name of the multimedia service, and charge information of the multimedia service.

10. The method according to claim 3, wherein the multimedia service comprises at least one of the following: a wallpaper service, a color ring service, a service about startup greeting message, a voice call ringtone service, a short message ringtone service, and a theme service.

11. The method according to claim 2, after sending a response about the instruction to the RFID-SIM card, further comprising:
  sending, by the POS, a charge changing message to a charging server so as to inform the charging server to perform corresponding charge for the multimedia service selected.

12. The method according to claim 2, wherein the information about the multimedia service comprises: serving name of the multimedia service, and charge information of the multimedia service.

13. The method according to claim 2, wherein the multimedia service comprises at least one of the following: a wallpaper service, a color ring service, a service about startup greeting message, a voice call ringtone service, a short message ringtone service, and a theme service.

14. The method according to claim 1, wherein the operation comprises establishing a connection between the RFID-SIM card and the POS, and the method further comprises: providing by the POS an interface to acquire a selection of a user made for the multimedia service.

15. The method according to claim 1, after sending a response about the instruction to the RFID-SIM card, further comprising:
  sending, by the POS, a charge changing message to a charging server so as to inform the charging server to perform corresponding charge for the multimedia service selected.

16. The method according to claim 1, wherein the information about the multimedia service comprises: serving name of the multimedia service, and charge information of the multimedia service.

17. The method according to claim 1, wherein the multimedia service comprises at least one of the following: a wallpaper service, a color ring service, a service about startup greeting message, a voice call ringtone service, a short message ringtone service, and a theme service.

18. A POS, comprising:
  a receiving module, configured to receive information about a multimedia service from an operator server and receive an operation from a RFID-SIM card;
  a displaying module, configured to display the information about the multimedia service;
  a generating module, configured to generate an instruction according to the operation, wherein the instruction is to send the information about the multimedia service to the RFID-SIM card; and
  a sending module, configured to send a response about the instruction to the RFID-SIM card;
  wherein after having received data, the RFID-SIM card first caches the data in the RAM by manner of cache queue and at the same time starts the process of transmitting the data from the RAM to the mobile terminal, the data received by the RFID-SIM card is added into the queue from the tail of the queue, and the data transmitted successfully is deleted from the head of the queue; when the queue is full, the POS is configured to be required to continuously retransmit the data until there is space to receive the data.

19. The POS according to claim 18, wherein the sending module is further configured to send a data file corresponding to a multimedia service selected by the user to the RFID-SIM card and to send a charge changing message to a charging server so as to inform the charging server to perform corresponding charge for the multimedia service, wherein the data file includes an image or ringtone received from the operator server by manner of wireless internet.

20. A mobile terminal, comprising a RFID-SIM card,
  wherein the RFID-SIM card comprises: a receiving unit configured to receive information about a multimedia service from a POS and a data file corresponding to a multimedia service selected by a user, wherein the information about the multimedia service is provided by an operator server, and the data file includes an image or ringtone received from the operator server by manner of wireless internet; a storing unit, configured to store the information about the multimedia service received from the receiving unit into a random access memory (RAM) of the RFID-SIM card; and a sending module, configured to send the multimedia service selected by the user to the POS; and
  the mobile terminal further comprises: an acquiring module, configured to acquire the multimedia service selected by the user; and a setting module, configured to read the information about the multimedia service from the RAM of the RFID-SIM card so as to make the information be selected by a user;
  wherein after having received data, the RFID-SIM card is configured to first cache the data in the RAM by manner of cache queue and at the same time start the process of transmitting the data from the RAM to the mobile terminal, wherein the data received by the RFID-SIM card is added into the queue from the tail of the queue, and the data transmitted successfully is deleted from the head of the queue; when the queue is full, the POS is required to continuously retransmit the data until there is space to receive the data.

* * * * *